July 14, 1964    J. W. EDWARDS ETAL    3,140,990
METHOD OF PREPARATION OF OZONE
Filed March 25, 1960
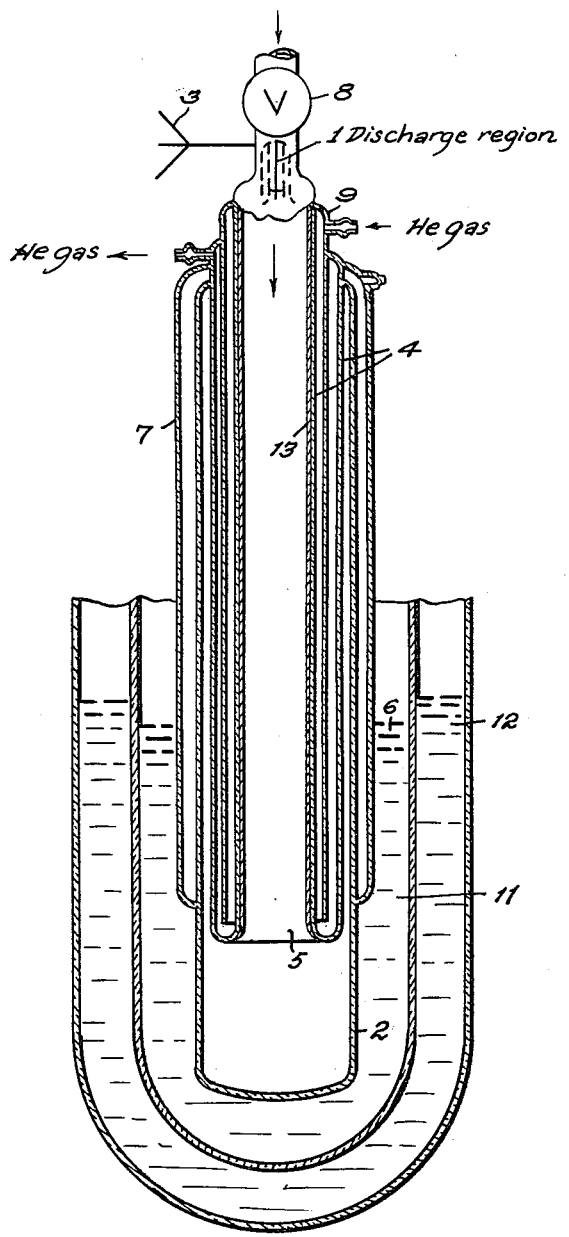
INVENTORS,
James W. Edwards
Joseph S. Hashman
By: S. J. Rotondi, A. O. Dupont
& J. J. Flynn

United States Patent Office 3,140,990
Patented July 14, 1964

3,140,990
METHOD OF PREPARATION OF OZONE
James W. Edwards, Dayton, Ohio, and Joseph S. Hashman, Evans City, Pa., assignors to the United States of America as represented by the Secretary of the Army
Filed Mar. 25, 1960, Ser. No. 17,716
1 Claim. (Cl. 204—176)

This invention relates to an improved method of preparing ozone and carbon monoxide.

More particularly, this invention is concerned with the increased production of ozone from carbon dioxide that has been subjected to an electrical discharge and condensed on a cold surface.

By means of this process a valuable by-product, carbon monoxide, is also formed along with ozone.

Ozone is an important oxidizing agent and may be used in fuels in missiles, as a bactericide and the like. Carbon monoxide recovered from this process may be used in the chemical synthesis of methanol and in fuels.

Numerous methods have been described for the production of ozone. The condensation at 4.2° K. of the gaseous products of a high-frequency electrodeless discharge through oxygen followed by the warming of the condensed solid has been shown by Broida and co-workers to lead to the formation of ozone. The Broida et al. U.S. Patent No. 2,892,766 relates to this subject matter. The conversion of oxygen to ozone by this method is about 18 percent effective, which is substantially more than the few percent of ozone obtained with the usual ozonizer.

This invention is an improvement over the Broida et al. patent, supra, and other methods of producing ozone.

Accordingly, the primary object of this invention is to obtain increased yields of ozone and carbon monoxide from a carbon dioxide source.

The single figure in the drawing illustrates the apparatus utilized in carrying out the process of the present invention.

Referring to the drawing:

Carbon dioxide gas is introduced through a control stopcock 8 from a source of said gas and passes through a discharge region 1. The discharge in discharge region 1 is excited by means of a microwave voltage of 2450 megacycles per second induced by antenna 3 which in turn is supplied from any suitable high frequency source. The single wall lower extremity 2 immersed in liquid helium 11 acts as a trap by freezing out all gases other than helium and thus constitute in effect a high speed vacuum pump for maintaining the flow of gas. In order to prevent solidification of discharge products at temperatures above about 4° K. (the liquefaction temperature of helium) and below about 77° K., the flow is carried to the region 2 within a passageway kept nearly at room temperature. This relatively high temperature is maintained by forcing helium gas at room temperature between compound walls 4 surrounding the channel 5 through which the discharge products pass. Since these walls make solid contact with the remainder of the system only at the upper extremity, as shown at 9, the introduction of such a sheath of warm gas extending considerably below the liquid helium level 6 causes but a slight heat input. By this means, however, the products of the discharge pass abruptly from room temperature to the collecting vessel 2 at approximately 4° K. and accumulate in solid form upon contact with the walls of vessel 2. A vacuum region 7 surrounds the entire assembly above the chamber 2. The liquid helium bath 11 may be insulated from the outside temperature by an additional bath of liquid nitrogen 12 to reduce the amount of liquid helium required to maintain vessel 2 at a very low temperature.

Channel 5 may be coated with a film of phosphoric acid, indicated at 13 in the drawing, from the discharge region to the cold trap. By the inclusion of a film of phosphoric acid on channel 5 greater yields of ozone are obtained in the collecting vessel.

The following example illustrates the process of the invention.

Carbon dioxide gas is passed successively through a calibrated flow meter, at a rate of 27.12 cc./min. at 25° C. and 760 mm. Hg, and then through a microwave resonator powered with a 125 watt, 2450 megacycle/sec. generator, and then into a cold chamber cooled by liquid helium (4° K.) A high voltage spark was used to initiate a glow discharge in the gas passing through the resonator, thus disassociating the gas. The complete gas stream was condensed in a cold chamber and then subsequently warmed to the distilling temperatures of the respective compounds resulting.

36 percent of the carbon dioxide was recovered as such while analysis showed the rest to have been converted to carbon monoxide, oxygen and ozone according to the following stoichiometry:

$$2CO_2 \rightarrow 2CO + O_2 \quad \text{(Eq. 1)}$$
$$3CO_2 \rightarrow 3CO + O_3 \quad \text{(Eq. 2)}$$

6.9 percent of the total carbon dioxide reacted according to Eq. 1 and 56.6 percent of the total carbon dioxide reacted according to Eq. 2. Expressed differently, 89 percent of the carbon dioxide consumed reacted to form ozone.

Another experiment was performed as above, except a solution of phosphoric acid was applied to channel 5 thereby coating the channel between the discharge region and the cold zone with a thin film of phosphoric acid. By virtue of this coating increase yields of ozone, over the 89 percent expressed above, resulted.

It has been shown that carbon dioxide gas when treated according to the present process unexpectedly produces large quantities of ozone. Carbon dioxide has heretofore been removed as an undesirable constituent in forming ozone. Contrary to this belief, it has been clearly proven that carbon dioxide is a valuable commercial source for good yields of ozone.

We claim:

A method for producing ozone and carbon monoxide by subjecting carbon dioxide to an electrical discharge capable of dissociating the mixture at ambient temperature and rapidly passing the products of said discharge through a phosphoric acid coated channel and into a low temperature cold trap maintained between 4° and 77° K. and recovering the ozone and carbon monoxide.

References Cited in the file of this patent

UNITED STATES PATENTS

| | | |
|---|---|---|
| 2,857,323 | Cromwell | Oct. 21, 1958 |
| 2,892,766 | Broida et al. | June 30, 1959 |
| 3,005,762 | Fenn | Oct. 24, 1961 |

OTHER REFERENCES

Glockler et al.: The Electrochemistry of Gases and Other Dielectrics (1939), pages 233–238.

Ellis et al.: The Chemistry of Ultraviolet Rays (1941), pages 45 and 307.

Steacie: American Chemical Soc., Monograph No. 102 (1946), pages 32, 33 and 36.